United States Patent [19]

Burr

[11] Patent Number: 4,709,178
[45] Date of Patent: Nov. 24, 1987

[54] MOTOR CONTROL FOR TELESCOPE

[76] Inventor: James D. Burr, 1960 Jefferson Co. Rd. 23, Evergreen, Colo. 80439

[21] Appl. No.: 35,085

[22] Filed: Apr. 6, 1987

[51] Int. Cl.$^4$ .................... H02R 5/02; G02B 23/16
[52] U.S. Cl. .................................. 310/80; 192/95; 248/231.8; 310/78; 310/91; 350/568; 464/89
[58] Field of Search .................. 192/83, 95, 107 M; 248/231.8, 316.7, 511, 674, 675; 310/67, 68, 78, 80, 83, 91; 350/537, 567, 568

[56] References Cited

U.S. PATENT DOCUMENTS

| | | | |
|---|---|---|---|
| 583,518 | 6/1897 | Stoller | 350/568 |
| 990,033 | 4/1911 | Colegrove | 192/95 |
| 2,713,970 | 7/1955 | Kueser | 464/89 |
| 3,003,339 | 10/1961 | Haushalter | 464/89 |
| 4,050,318 | 9/1977 | Wolf | 350/567 |
| 4,541,294 | 9/1985 | Byers | 350/568 |
| 4,588,913 | 5/1986 | Adami | 310/78 |

Primary Examiner—Patrick R. Salce
Assistant Examiner—D. L. Rebsch
Attorney, Agent, or Firm—Kolisch, Hartwell & Dickinson

[57] ABSTRACT

A motorized drive attachment for rotating a rotatable control shaft in a telescope. The attachment includes a motor within a housing, and a coupler on the output shaft of the motor interiorly lined with an O-ring. A snap-on bracket, secured to the housing detachably clamps onto a frame portion of the telescope, and in this position holds the attachment in place with the coupler providing a direct drive to the control shaft. The O-ring acts as a slip clutch when the control shaft is operated manually.

6 Claims, 5 Drawing Figures

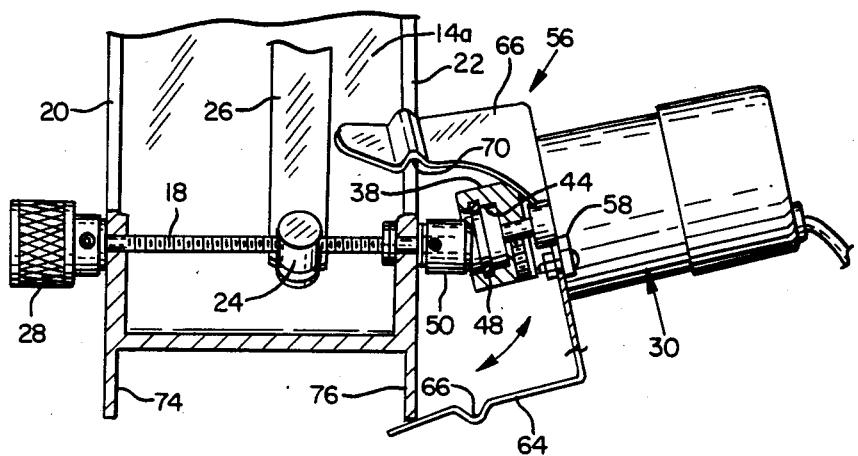
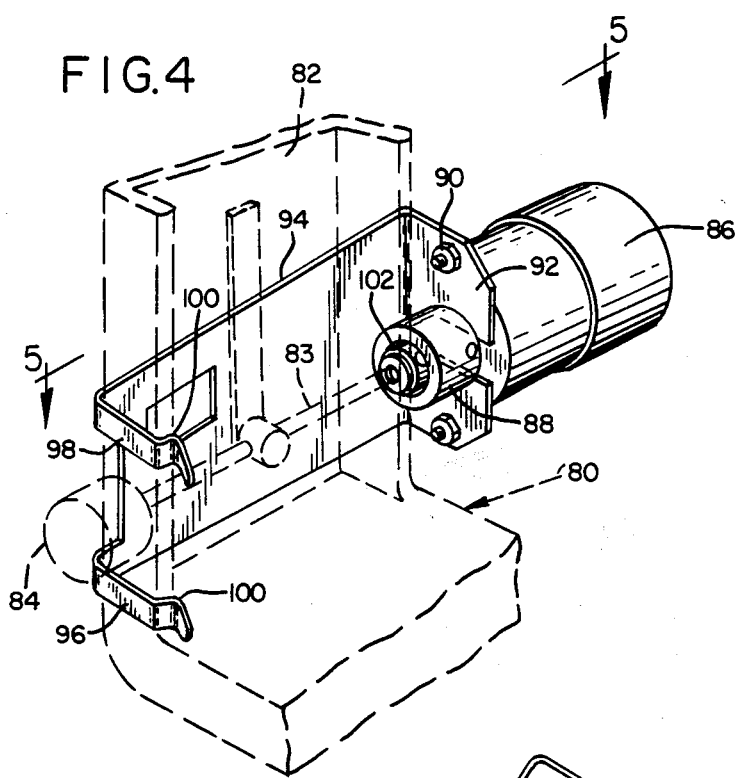
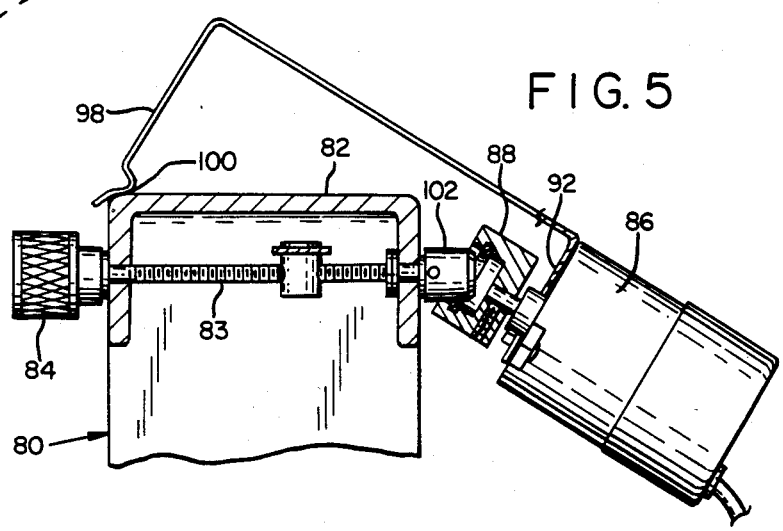

MOTOR CONTROL FOR TELESCOPE

BACKGROUND AND SUMMARY OF THE INVENTION

This invention relates to a motor control system for a telescope usable in controlling the position of the viewing assembly or telescope tube in the telescope. The invention is particularly applicable to a control system for making adjustments in the declination of the viewing assembly of the telescope, although in disclosing the invention in the context of declination adjustments, it is not intended to preclude the application of the invention toward the making of other adjustments in the telescope where smooth, vibration-free operation is desired.

A common form of mounting system for an astronomical telescope embodies a two axes system having an inclined rotation axis which parallels the earth's rotation axis and a second horizontal rotation axis which intersects the inclined axis at right angles to a vertical plane containing the latter axis. The inclined axis is referred to as the polar axis of the telescope and the horizontal axis is referred to as the declination axis. Rotation of the telescope tube about the declination axis adjusts the elevation of the telescope tube to correspond to the latitude at which the telescope is used. Rotation of the telescope tube about the polar axis moves the telescope tube in a rotary tracking motion.

Adjustments in declination are generally accomplished utilizing a knob attached to a lead screw which operates a tangent arm connected to the viewing assembly or telescope tube in the telescope. Such adjustments may be done manually, however, an electric motor facilitates this adjustment, especially when used with video cameras where smooth vibration-free operation is imperative. Whenever a telescope is used with a time exposure camera, it is absolutely necessary to have a motor operate the lead screw since the slightest touch of the hand to the telescope would ruin the picture due to the high magnification.

A number of suppliers produce motor systems for controlling declination, but those known to me have been subject to a number of shortcomings. Most use pulleys and rubber belts which interconnect a motor with the lead screw in the declination control system, and such assemblies tend to give backlash and not be dependable, with the most frequent complaint being that the belts fall off and are hard to find in the dark. Declination motors that use belts also require that the user drill holes in the telescope frame to attach the motor, and with the motor attached, such motor protrudes so far that the telescope will not fit in the case which is provided for carrying the telescope. Gear systems have also been suggested, but these tend to be expensive, and since the gears in the system are small, malfunctioning due to slipping or binding frequently occurs.

A general object of this invention is to provide a motorized drive attachment for installation with a rotatable control shaft of a telescope which is easily installed, simple in operation, and which is free of the general problems characterizing existing systems.

More specifically, an object is to provide such a motorized drive attachment which provides direct coupling of a motor in the attachment with the telescope control shaft with the elimination of gears or drive belts.

A related object is to provide such a drive attachment which includes a coupler connecting the drive shaft of the motor with the control shaft of the telescope, the coupler including a socket opening lined with an annular elastomer drive member, which may be, for instance, an O-ring, which establishes a driving connection between the coupler and the control shaft. With the attachment mounted on the telescope and coupled to one end of a control shaft, such as a rotatable declination shaft which has a knob on its opposite end for manual control, the annular drive element may also function as a clutch accommodating slipping within it of the declination shaft when the declination shaft is turned manually by the knob on its opposite end.

The drive attachment further features a novel releasable clamp structure with flexible and resilient clamps which move into a seated position on the frame of the telescope with the attachment in place. The attachment is readily mounted and demounted from the telescope frame in the dark and under conditions of field use.

These and other objects and advantages are obtained by the invention, which is described hereinbelow in conjunction with the accompanying drawings, wherein:

FIG. 1 is a perspective view of one form of telescope which includes a viewing assembly or telescope tube rotatably supported on a fork frame for movement about a horizontal axis to change the declination of the viewing assembly, and further illustrating a motorized drive attachment mounted on the fork frame and operatively connected to a rotatable control shaft, i.e., rotatable declination shaft in the telescope;

FIG. 3 is a view similar to FIG. 2, but showing the drive attachment partially disassembled from the telescope;

FIG. 4 is a perspective view illustrating a different form of telescope and with a modified form of motorized drive attachment mounted thereon; and FIG. 5 is a view taken generally along the line 5—5 in FIG. 4 but showing the attachment partially disassembled from the telescope.

Figure 1:
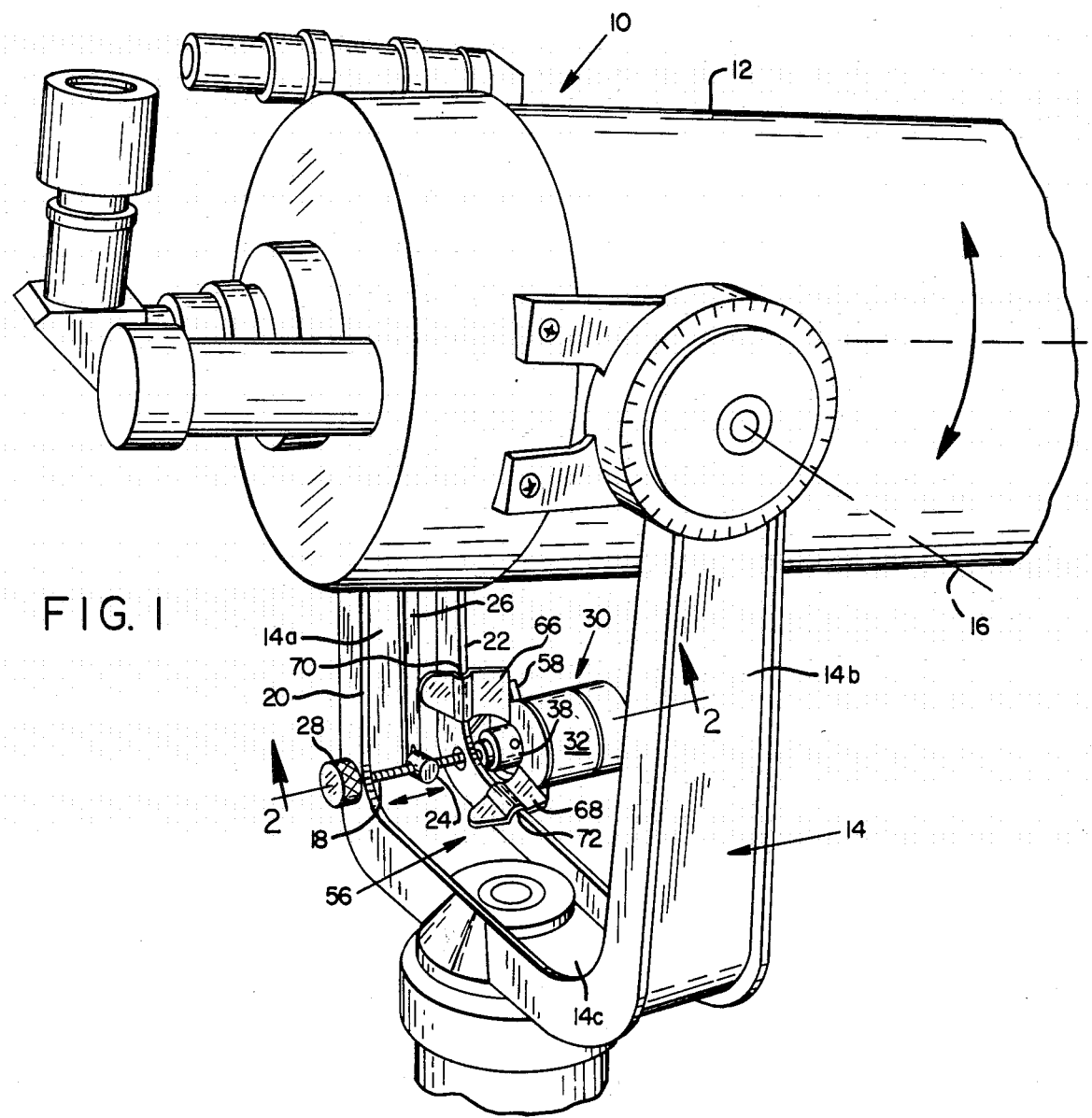
Figure 2:
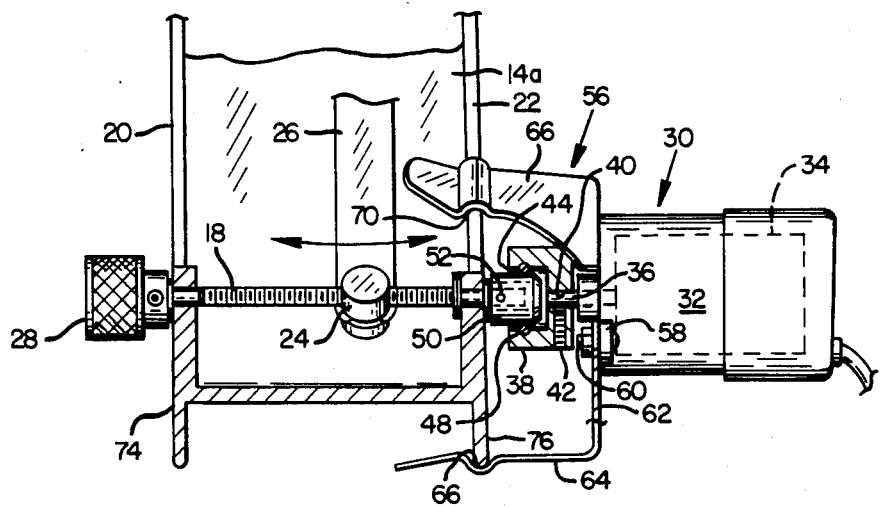
FIG. 2 is a view taken generally along the line 2—2 in FIG. 1.

Referring now to the drawings, and first of all more particularly to FIGS. 1 through 3, indicated generally at 10 is a telescope including a tube or viewing assembly shown at 12 mounted on a fork frame 14 having upstanding legs 14a, 14b interconnected at their base by expanse 14c. The tube or viewing assembly is relatively rotatably mounted on the top end of the legs of the frame for movement about a horizontal declination axis 16. Movement of the viewing assembly about this axis adjusts the elevation of the telescope tube to correspond to the latitude at which the telescope is used.

In a common type of telescope, adjustment in the position of the viewing assembly about this declination axis is performed through rotation of a rotatably mounted control shaft, also referred to as a declination shaft, shown at 18. The shaft is suitably rotatably mounted in flanges 20, 22 extending downwardly along the inner side of leg 14a and continuing onto expanse 14c. The shaft is threaded where such extends between the flanges and supports a threaded follower 24 screwed onto the threaded portion of the shaft. A protruding portion of the follower engages the lower extremity of a tangent arm 26 extending downwardly along the inner side of leg 14a. The tangent arm is connected to the viewing assembly or tube, and with advancement of the follower along the declination shaft through turning of the shaft, this produces swinging of telescope the tangent arm with movement of tube 12 about declination axis 16.

A declination knob 28 is secured to one end of shaft 18 where such protrudes to one side of the fork frame. The knob permits the user through finger gripping of the knob manually to rotate the knob to produce adjustment in the declination of tube 12. Shaft 18 also has another end protruding from the opposite side of the fork frame, and as will be described, such is coupled to the output or drive shaft of an electric motor forming part of a motorized drive attachment shown generally at 30. In a typical telescope, and without the drive attachment, it is common to have another knob, resembling knob 28, mounted on this opposite protruding end, with either knob being usable in producing adjustment in the declination of the telescope.

Drive attachment 30, and referring to FIG. 2, includes a motor housing 32 housing within it an electric motor 34 which drives an output or drive shaft 36 which protrudes out from one end of the housing.

A cylindrical coupler 38 is mounted on the end of this drive shaft. The coupler includes a counter bore 40 which receives the protruding end of the drive shaft and securement of the coupler to this shaft is with a set screw 42.

The coupler includes a cylindrical socket 44 opening concentric with the drive shaft which faces outwardly from the end of the drive shaft. Spaced slightly inwardly from the open end of the socket opening is an annular groove and seated within this groove is an elastomer O-ring, also referred to as a plastomer drive member, shown at 48. The inner circumferential margin of the O-ring has a diameter which is somewhat less than the diameter of the socket opening, which results in the inner circumference of the O-ring protruding radially inwardly from the wall of the socket opening.

In modifying a factory supplied telescope for mounting of the motorized drive attachment, any knob which is present on the declination shaft on the end of the shaft opposite the end having knob 28 is removed. The knob is replaced with a cylindrical stub sleeve 50 secured to the protruding end of the declination shaft with a set screw 52. The outer diameter of this sleeve is less than the inner diameter of the socket opening 44 but slightly greater than the inner diameter of the O-ring. As a result, the coupler may be slid over the sleeve with the sleeve moving easily into the socket opening. There is slight negative for the sleeve at the location of the O-ring, but the pliant nature of the O-ring permits the sleeve to move into and through the O-ring.

A releasable snap-on bracket 56 or, spring clamp, is secured to an end of the motor housing utilizing ears 58 provided on the housing and fasteners 60 securing these ears to the snap-on bracket. The snap-on bracket may be made of spring steel or suitable plastic having requisite resilient flexibility.

Bracket 56 includes a web portion 62 which is normal to the axis of shaft 40. As probably best illustrated in FIG. 1, joined to this web portion and extending outwardly therefrom are a pair of clamp arms or tabs 66, 68 located approximately on either side of the motor drive shaft. Each is shaped to have a channel extending transversely thereacross, such being shown for tab 66 at 70 and for tab 68 at 72. Joined to and projecting out from web portion 62, and on the opposite side of coupler 38 from clamp arm 66, 68 is another clamp arm 64 also formed with the channel, indicated at 66. In FIG. 1, arm 64 is obscured from the viewer, but such is visible in FIGS. 2 and 3 (arm 68 having been removed from FIGS. 2 and 3 to illustrate details of internal construction).

In mounting the attachment on the fork frame, clamp arms 66, 68 may initially be placed with their channels 70, 72 resting on the edge of a flange (flange 20) extending along the inside of the fork frame. This positioning may be done with placement of coupler 38 immediately adjacent the outer end of sleeve 50, as shown in FIG. 3. Rocking of the attachment about the fulcrum provided by arm 66, 68 (in a general clockwise direction as the attachment is viewed in FIG. 3), causes coupler 38 to move over sleeve 50 with the sleeve advancing into socket opening 44. This prepositions the end of the declination shaft in the socket opening. Continued rocking movement of the attachment with the declination shaft so prepositioned moves the lower clamping arm 64 over the flange extending along the outside of leg 14a (flange 76) with channel 66 in this clamp arm finally reaching a seated position on this flange (compare the position shown for flange 64 in FIG. 3 with the position shown for the flange in FIG. 2). The O-ring provides enough clearance to permit the sleeve to move fully within the socket opening during this final seating of snap-on bracket 56. With the attachment completely seated, the coupler and declination shaft are substantially in axial alignment, and the O-ring within the coupler establishes a driving connection between the coupler and the declination shaft.

Ordinarily, the motor within the attachment may be a DC motor and, with energizing, the output shaft thereof rotates at a relatively low speed, for example one or two revolutions per minute. Such rotation is imparted to the declination shaft through the coupler with the attachment seated. A direct drive is established between the motor and the declination shaft without the presence of pulleys, drive belts, or gears. The driving connection is such as to permit slippage of the declination shaft with respect to the coupler in the event that it is desired to produce declination shaft rotation employing the knob which is present at the opposite end of the shaft. The attachment described is easily mounted in place on the fork frame of the telescope in the dark. It can also as easily be removed. As a consequence, the telescope may be packed and carried in its usual carrying case without the attachment in place and offering any impediment to packaging in the case. The motor with the attachment in place provides a smooth vibrationless drive of the declination shaft. The attachment in its entirety is compact and producible at relatively low cost.

Referring to FIGS. 4 and 5, in these figures, a motorized drive attachment of a modified form is shown. In this modification, the fork frame 80 mounting the telescope tube includes a leg 82. A declination shaft 83 extends between opposite side edges of leg 82, one end of the shaft mounting a declination knob 84. The drive attachment includes a motor housing 86 housing the motor with a coupler 88 secured on the drive shaft thereof which protrudes from the motor housing. The snap-on bracket employed is against secured to tabs on the motor housing with fasteners shown at 90.

In this case, the bracket includes a web 92 and extending from this web, at a substantially right angle, a plate expanse 94. Integrally joined to the remote end of the plate expanse are a pair of resiliently deformable clamp arms 96, 98 substantially normal to the plate expanse and paralleling each other. These are shaped to have ridges such as the one at 100 adjacent their distal ends.

Prior to mounting of the attachment, stub sleeve 102 is secured to the end of shaft 83. The attachment is mounted in place by first slipping the end of the socket opening in coupler 88 over the stub sleeve. This prepositioning is performable with the ends of clamp arms 96, 98 coming up against the side of the leg in the fork frame, and with the plate expanse extending in an inclined relationship across the side of the leg. The clamp arms may then be moved over the edge of the leg in the fork frame, to reach a finally seated position where they extend across the edge with ridges 100 snapping under the edge.

As in the case of the first modification of the invention, the drive attachment is easily mounted in place in the dark, and is as easily demounted. A direct drive is established between the output or drive shaft of the motor and the declination shaft. The drive member or O-ring produces a drive connection but also functions to provide a slip clutch at such time as the operator of the telescope wishes to produce a declination change utilizing the knob which is present on the declination shaft.

While there has been described modifications of the invention, it is obvious that changes and variations are possible without departing from the invention.

It is claimed and desired to secure by Letters Patent:

1. A motorized drive attachment for installation with the rotatable control shaft of a telescope where the shaft is mounted on and protrudes from a frame portion of the telescope, comprising:
    a drive motor and a housing enclosing the motor, the motor having a drive shaft which projects therefrom and is exposed exteriorly of the motor housing,
    a coupler secured to the exposed end of the drive shaft having a socket opening facing outwardly of the end of the shaft and said opening being lined with an annular drive element of plastomer material disposed concentric with the drive shaft and which is mounted within and extends about the interior of said socket opening, and
    releasable clamp structure secured to the motor housing constructed to fit about the frame portion of the telescope with the control shaft of the telescope extending into said opening of the coupler and frictionally engaged circumferentially by the drive element with the drive element establishing a direct drive between the motor and control shaft.

2. The attachment of claim 1, wherein the clamp structure comprises a flexible and resilient clamp arm shaped to enable sliding of the clamp arm over said frame portion to reach a seated position thereon with the control shaft prepositioned in said opening of said coupler.

3. The attachment of claim 1, wherein the frame portion of the telescope is a portion of a mounting fork which mounts the viewing assembly in the telescope and the control shaft is a shaft that is rotatably mounted on said fork portion and that is rotatable to adjust the declination of the viewing assembly of the telescope, and the clamp structure comprises a flexible and resilient clamp arm shaped to enable sliding of the clamp arm over said portion of the fork to reach a seated position thereon with the control shaft prepositioned in said opening of said coupler.

4. The motorized drive attachment of claim 1, wherein said clamp mechanism includes opposed flexible and resilient clamp arms, one being shaped to have a seated position on one side of said frame portion and in said seated position enabling movement of the housing in a direction causing the socket opening of the coupler to shift over the end of the control shaft thus to preposition it, the other of the clamp arms having a flexible and resilient construction enabling it to be slid over the frame portion to reach a seated portion thereon with the control shaft prepositioned in said opening of said coupler.

5. In combination with a telescope including
    a viewing assembly and a fork frame with upstanding legs mounting the viewing assembly, the telescope further including a tangent arm extending along one of the legs of the fork frame adjustable to adjust the declination of the telescope and the telescope further having a rotatable control shaft with opposite ends projecting outwardly from opposite sides of said one leg of said fork frame and operatively connected to said tangent arm,
    a manually turnable declination knob secured to one of said ends of said control shaft for turning said control shaft manually, and a motorized drive attachment detachably mounted on said one leg of said fork frame for turning said control shaft under power,
    said drive attachment including a drive motor and a housing enclosing the motor with the motor having a drive shaft projecting from one end of the housing and exposed exteriorly of the housing, a coupler secured to the exposed end of the drive shaft having a socket opening facing outwardly of the end of the shaft and said socket opening being lined with an annular drive element of plastomer material disposed concentric with the drive shaft and mounted within the interior of the socket opening, and releasable clamp structure secured to the motor housing releasably fitting about said one leg of said fork frame with the opposite end of the control shaft of the telescope extending into said opening of the coupler and frictionally engaged by the inner circumference of the drive element with the drive element establishing a direct drive between the motor and control shaft, the drive element also functioning as a clutch and permitting turning of the control shaft with the declination knob without turning of the coupler.

6. The combination of claim 5, wherein the releasable clamp structure includes opposed flexible and resilient clamp means, one having a seated position on one side of leg of said fork frame and the other having a seated position on the other side of said leg of said fork frame, one of said clamp means being flexible and resilient to enable release from said one leg and subsequent removal of said coupler from said end of said control rod.

* * * * *